Aug. 9, 1949.  R. R. KYKER  2,478,282
RAKE STRUCTURE
Filed Dec. 29, 1947

Reed Robert Kyker
INVENTOR.

BY Clarence A. O'Brien
and Harvey B. Jacobson
Attorneys

Patented Aug. 9, 1949

2,478,282

UNITED STATES PATENT OFFICE 2,478,282

RAKE STRUCTURE

Reed Robert Kyker, Ringling, Okla.

Application December 29, 1947, Serial No. 794,318

4 Claims. (Cl. 56—400)

This invention relates to new and useful improvements and structural refinements in rake structures, more specifically, structures of power rakes which are usually attached or mounted upon tractors, or the like, and the principal object of the invention is to provide a rake which embodies in its construction what may be referred to as yieldable teeth or tines, so as to facilitate satisfactory operation of the rake over uneven ground without the danger of bending, breaking or otherwise damaging the tines.

A further object of the invention is to provide a rake structure which is simple, effective in operation, and which will function for considerable periods of time without adjustment or other form of attention.

Another object of the invention is to provide a rake structure which readily lends itself to economical manufacture, and which is otherwise well adapted for the purpose for which it is intended.

With the above more important objects in view and such other objects as may become apparent as this specification proceeds, the invention consists essentially of the construction and arrangement of parts as shown in the accompanying drawings in which.

Like characters of reference are employed to designate like parts in the specification and throughout the several views.

Figure 1:
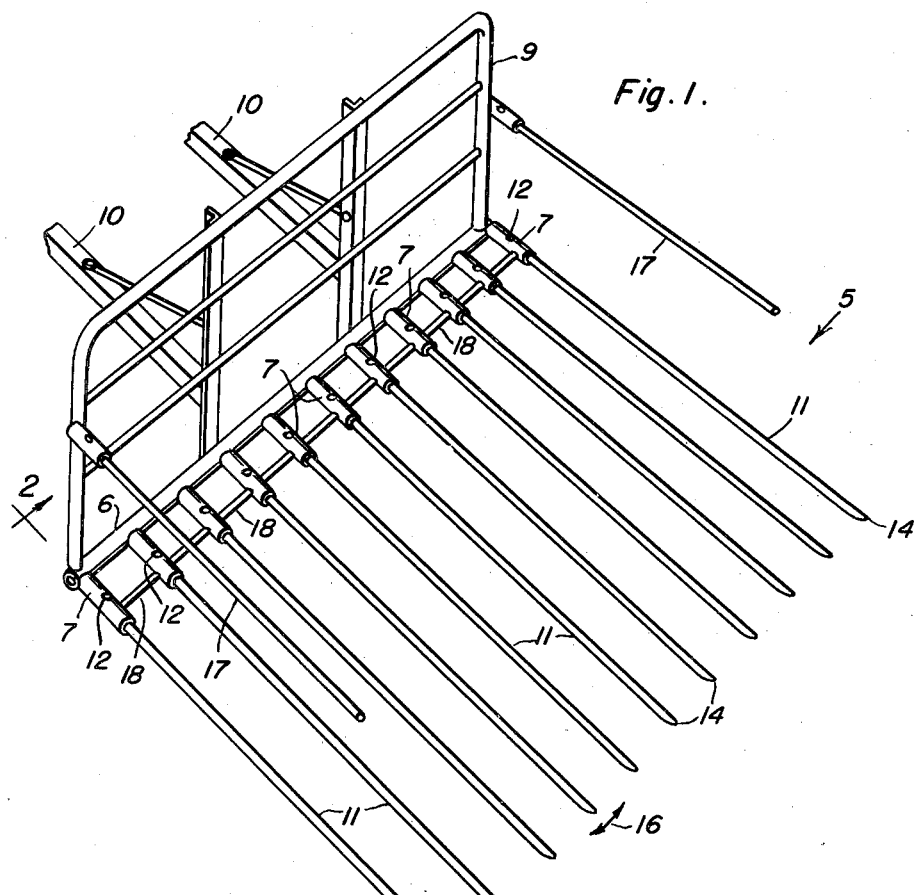
Figure 1 is a perspective view of the invention.
Figure 2:
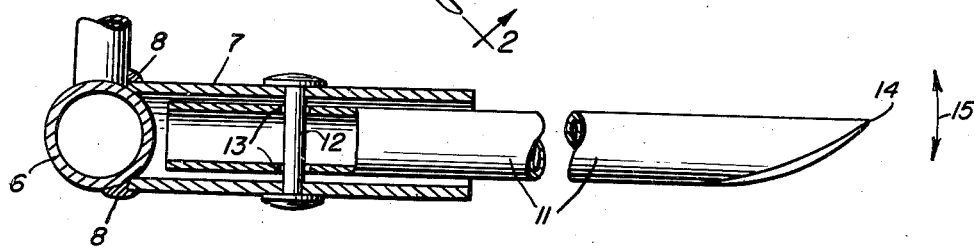
Figure 2 is a cross sectional view taken substantially in the plane of the line 2—2 of Figure 1.

Referring now to the accompanying drawings in detail, the invention consists of a rake structure designated generally by the reference character 5, the same embodying in its construction a substantially horizontally carrier bar 6 to which a row of tubular sockets 7 are welded or otherwise similarly secured, as at 8.

What is usually known as a hay board assumes the form of a suitable, rigid frame work 9 which is secured to the carrier bar 6 and extends upwardly therefrom, as will be clearly apparent from the accompanying drawings. The frame work 9 includes a pair of brackets or arms 10, whereby the entire rake structure may be conveniently attached to a tractor in the conventional, well known manner.

The essence of novelty in the invention resides in the provision of a plurality of tines 11, each of which has one end portion thereof inserted in one of the sockets 7, wherein it is movably secured by means of a transversely extending rivet or pin 12.

It will be noted that the rivet 12, extending transversely of the socket 7, passes through a pair of diametrically opposed and axially aligned apertures 13 with which the tine 11 is provided, the tine being of tubular construction and the free end portion thereof terminating in a pointed extremity 14, substantially as shown.

It is to be noted that the outer diameter of the tines 11 is considerably smaller with respect to the inner diameter of the sockets 7 and moreover, that the apertures 13 are somewhat larger with respect to the diameter of the rivets 12. By virtue of this arrangement, movement of the tines 11 in the direction of the arrows 15 will be facilitated, while the sockets 7 remain relatively stationary. As a result, the tines 11 will be permitted to rise and fall when encountering rocks, stones, or the like, or with the unevenness of the ground, without becoming bent or otherwise damaged.

Moreover, the tines 11 are permitted to move laterally as indicated as at 16, whereby their ability to clear upwardly projecting obstructions on the ground is, of course, enhanced. The movement of the tines in the direction 16 is facilitated by the pivotal action of the tines on the rivets 12. It is to be noted that the sockets 7 are extended beyond the rivets 12, so that the extended portions thereof effectively restrict the extent of movement of the tines in a horizontal as well as vertical plane.

Additional tines and sockets assuming the form of hay guards 17 may, if desired, be provided on the frame work 9, the structure of these tines and sockets being similar to that of the tines and sockets 11 and 7 respectively, already described.

Moreover, the sockets 7 may be reinforced by means of suitable bars or braces 18 interposed between the adjacent sockets and rigidly secured in position by welding, or the like.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a rake structure, the combination of a horizontal carrier bar, a stationary support member on said bar, a vertical fulcrum pin in said member, a tine provided in one end portion thereof with an aperture to receive said pin whereby the tine is movable in a horizontal plane, and means for restricting the extent of movement of said tine.

2. In a rake structure, the combination of a horizontal carrier bar, a stationary support member on said bar, a vertical fulcrum pin in said member, a tine provided in one end portion thereof with an aperture to receive said pin, said aperture being substantially larger in diameter than said pin whereby the tine is movable in a vertical plane, and means for restricting the extent of movement of said tine.

3. In a rake structure, the combination of a horizontal carrier bar, a stationary support member on said bar, a vertical fulcrum pin in said member, a tine provided in one end portion thereof with an aperture to receive said pin, said aperture being substantially larger in diameter than said pin whereby the tine is movable in vertical and horizontal planes, and means for restricting the extent of movement of said tine.

4. In a rake structure, the combination of a horizontal carrier bar, a tubular socket secured at one end thereof to said bar and extending horizontally therefrom, a vertical fulcrum pin extending through an intermediate portion of said socket, and a tine having one end portion thereof positioned in said socket and formed with an aperture to receive said pin, said tine being substantially smaller than the inside diameter of said socket and said aperture being substantially larger in diameter than said pin whereby the tine is movable in vertical and horizontal planes, said socket being extended beyond said pin and the extended portion thereof being engageable by said tine whereby the extent of horizontal and vertical movement of the tine is restricted.

REED ROBERT KYKER.

REFERENCES CITED

The following references are of record in the file of this patent:

UNITED STATES PATENTS

| Number | Name | Date |
|---|---|---|
| 23,098 | Long | Mar. 1, 1859 |
| 69,610 | Ball | Oct. 8, 1867 |
| 199,486 | Adriance | Jan. 22, 1878 |